United States Patent [19]

Hix et al.

[11] 4,160,228

[45] Jul. 3, 1979

[54] METHOD AND APPARATUS FOR TESTING MARINE SEISMIC CABLES

[75] Inventors: Larry J. Hix, Plano; Phillip W. Wise, Richardson; David H. Bennyhoff, Plano, all of Tex.

[73] Assignee: Atlantic Richfield Company, Los Angeles, Calif.

[21] Appl. No.: 773,376

[22] Filed: Mar. 1, 1977

Related U.S. Application Data

[62] Division of Ser. No. 651,894, Jan. 23, 1976, abandoned.

[51] Int. Cl.$^2$ ............................................. G01V 1/38
[52] U.S. Cl. ............................ 340/7 R; 340/15.5 CP; 73/1 DV; 181/110
[58] Field of Search ............... 340/7 R, 3 T, 15.5 GC, 340/15.5 CP; 181/108, 110; 73/552, 1 D, 1 DV

[56] References Cited

U.S. PATENT DOCUMENTS

| | | | |
|---|---|---|---|
| 3,290,644 | 12/1966 | Hoskins | 340/7 R |
| 3,713,084 | 1/1973 | Mayne et al. | 340/7 R |
| 3,786,408 | 1/1974 | Jenkinson et al. | 340/7 R |
| 3,858,169 | 12/1974 | Bardeen | 340/15.5 CP |
| 3,859,620 | 1/1975 | Percy | 73/1 DV |
| 3,864,664 | 2/1975 | Trott | 73/1 DV |

*Primary Examiner*—Howard A. Birmiel
*Attorney, Agent, or Firm*—Robert M. Betz

[57] ABSTRACT

A marine seismic streamer to be tested is towed through the water in a fully deployed state past a lightweight, portable acoustic energy source submerged beneath a stationary float. The electrical output of multiple pressure transducers distributed along the streamer is recorded on the towing vessel in response to acoustic pulses generated every few seconds by the source, a separate channel being indicative of the combined transducer output of each streamer section. Output signals failing to exhibit normal wave shape or decay characteristics as the distance varies between individual streamer sections and the stationary source may be indicative of faulty transducers or electrical or mechanical cable failures.

2 Claims, 4 Drawing Figures

METHOD AND APPARATUS FOR TESTING MARINE SEISMIC CABLES

This is a division, of application Ser. No. 651,894 filed Jan. 23, 1976 now abandoned.

BACKGROUND OF THE INVENTION

1. Field of the Invention

This invention is generally related to the field of marine seismic operations and more particularly to the testing of marine seismic cables or streamers under actual prospecting conditions.

2. Description of the Prior Art

Marine seismic streamers are frequently a mile or more in length and are towed through the water behind an instrument-carrying vessel adapted to record seismic information transmitted along the cable from a series of pressure detectors disposed at intervals within such cable. The cable usually consists of many sections, each containing a group of transducers interconnected to provide a common output. If the cable is composed of a hundred such sections, there will be a hundred pairs of leads of gradually increasing length.

If any of the pressure detectors are defective or if their electrical connections with the recording equipment is damaged, the response of such detectors to seismic reflections may be either misleading or lost completely. It is therefore desirable to in some manner determine whether all the detectors in a marine streamer are in fact functional before embarking on an offshore seismic operation.

A streamer is normally carried on a reel on the deck of the two vessel to the location of interest. If the cable is electrically connected to the recording instruments, it is possible to perform a gross polarity check of each detector by pounding on the reel with a hammer. However, this is in no sense an adequate check of the quality or performance of individual detectors. A better technique is to submerge the reeled streamer beside the two vessel and activate an acoustic energy source mounted on the vessel. This will provide an indication of polarity and amplitude of the electrical output of each transducer. It is however subject to the disadvantage that it does not duplicate actual prospecting conditions. When the streamer is deployed behind the tow vessel, it may stretch and cause breaks, electrical discontinuities or other damage affecting the performance of the detectors.

What is needed therefore is an effective means and method for testing a marine streamer under actual working conditions immediately prior to a seismic run.

It should be noted that with computer techniques now available the interpretation of seismic records has been refined to a high degree. Therefore, anomalies in transducer performance which formerly were not significant may now seriously interfere with geophysical work.

SUMMARY OF THE INVENTION

It is therefore a general object of this invention to provide an improved method and apparatus for testing marine seismic cables.

It is another object of this invention to provide an improved means and apparatus for checking the output and polarity of pressure detector devices along a marine seismic cable.

It is still another object of this invention to provide a lightweight, portable acoustic energy source adapted for use in testing of marine seismic cables.

Other objects and advantages of this invention will become apparent from a consideration of the detailed description to follow taken in conjunction with the drawings and the appended claims.

In a preferred embodiment of this invention, a portable, self-contained acoustic energy source comprises a cylindrical housing supported in a submerged condition by means of a float collar so that its open lower end is exposed to the sea. Leads from oxygen and propane bottles supported on the float collar are brought in to the upper end of the housing and there combined to provide a continuous source of explosive mixture. A battery powered sparker unit of conventional construction also supported on the float collar is connected through a hermetically sealed feedthrough into the upper end of the housing and terminates in a suitable spark plug. In operation the sparker ignites the propane-oxygen mixture at a rapid repetition rate to provide downwardly directed acoustic pulses into the water, the spent combustion gases being expelled directly through the lower end of the housing.

A marine streamer cable to be checked is towed past the portable floating energy source behind a tow vessel containing recording instruments electrically connected to each of a plurality of pressure transducer groups disposed along the streamer. As the distance between each detector or transducer and the energy source first decreases and then increases, the amplitude of the recorded signal will correspondingly increase to a maximum and then decrease. The method therefor involves the step of comparing not only the polarity of the output of the pressure detectors but also the amplitude progression of their wave shapes.

In an alternate embodiment the method consists in anchoring the streamer to be tested in one position and traversing its length in a small boat from which the lightweight acoustic energy source is suspended in the water. As above, the pattern of variable signal outputs from each of the transducers is noted with varying distance between said transducers and the energy source anomalies are easily spotted.

DESCRIPTION OF THE PREFERRED EMBODIMENTS

Figure 1:
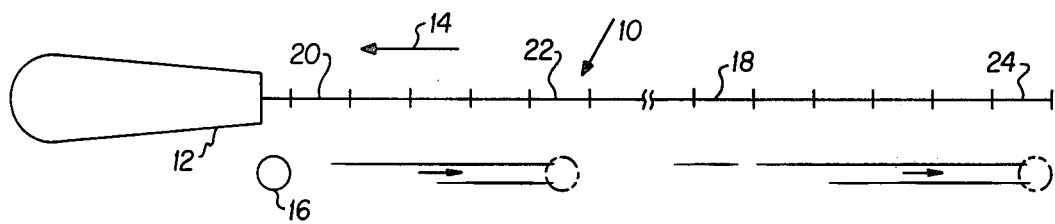
FIG. 1 is a diagrammatic view of a marine streamer in extended position being towed behind a instrumentation vessel and showing the location of the portable acoustic energy source.

With reference now to FIG. 1, a marine seismic cable 10 is shown diagrammatically in deployed position behind a towing vessel 12. In accordance with the practice of this invention, it is assumed that the cable 10 has been carried on the vessel 12 to an offshore location preparatory to the beginning of a seismic survey. As the vessel 12 tows the cable 10 in the direction of the arrow 14, an acoustic energy source 16 is deposited in the water at a location ahead of the cable 10 and in close proximity thereto, for example at a lateral distance of from 50 to 300 meters. The source 16 is self-contained and provided with float means for suspension. Its purpose is to inject a series of acoustic pulses into the water which will be received by the pressure responsive devices such as electroacoustic transducers disposed along the length of the cable 10.

It is conventional practice to construct the cable 10 such that a group of transducers contained within a given section of the cable 10, such as section 18, have a common output which is recorded on the towing vessel on a single channel. Each time the signal or the energy source 16 is pulsed, a signal is produced representative of the output of each individual cable section. For a given energy source, this output will have a recognizable wave shape or pattern. When the source 16 is at its minimum distance from a given streamer section, such as section 20, the amplitude of the electrical output signal is a maximum. Sections at greater distances, such as section 22, will indicate a decay in amplitude; and finally sections at the far end of the cable 10, such as section 24, will display no discernible response whatever. As the test continues and the position of the source 16 relative to the cable 10, the closest cable section to the source may be expected to produce the maximum signal amplitude with a pattern of signals of progressively decreasing amplitude from sections on either side thereof. The tow speed is correlated with the repetition rate of acoustic pulses from source 16 so as to insure that a clearly recognizable pulse is produced by every section of the cable 10. By inspecting a display of the recorded output wave shapes for each acoustic pulse, the existence of an anomalous wave shape or reversed polarity can readily be determined. Also if an individual section output does not display the decay pattern followed by adjacent sections, this fact will also be evident. Any of these anomalies may indicate one or more faulty transducers within the group associated with a given cable section or alternatively give evidence of severed or defective wire connections requiring repair.

As an example of the operation of this method, the marine cable 10 may consist of forty-eight sections, each having a length of approximately fifty meters. If vessel 12 tows at a speed of five knots and the source 16 supplies a pulse every eighty seconds, it will require approximately ten pulses to complete the test. Obviously, the higher the rate at which pulses are injected, the greater becomes the amount of data and the accuracy of the information. However, a meaningful test can be obtained so long as the pulse rate is sufficient to insure overlap between successive pulse records.

Figure 2:
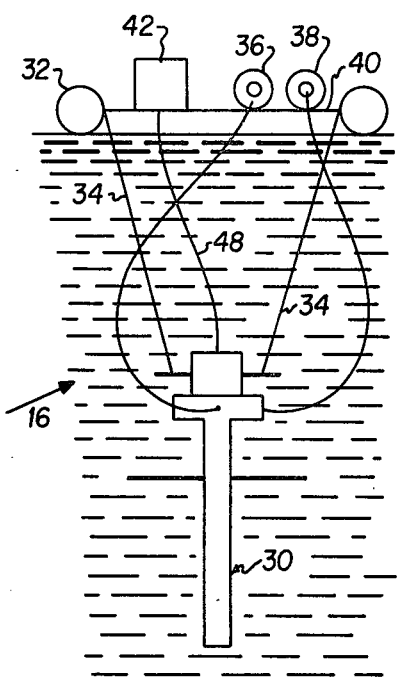
FIG. 2 is a diagrammatic view of a portable acoustic signal source in accordance with this invention.

With particular reference to FIG. 2, there is shown an acoustic signal source 16 in accordance with this invention consisting generally of a cylindrical explode housing 30 supported in a submerged condition from inflatable float 32 by means of ropes 34. In a manner to be described, a combustible gas mixture is introduced within a reaction chamber in housing 30 whose lower end is open to the water. The constituents of the gas mixture may be supplied from separate bottled gas sources, for example oxygen and propane bottles 36 and 38 resting on a shelf 40 carried by the float 32. A self-contained pulser 42 provides a repetitive spark which is brought within the housing 30 in communication with its reactor chamber.

Figure 3:
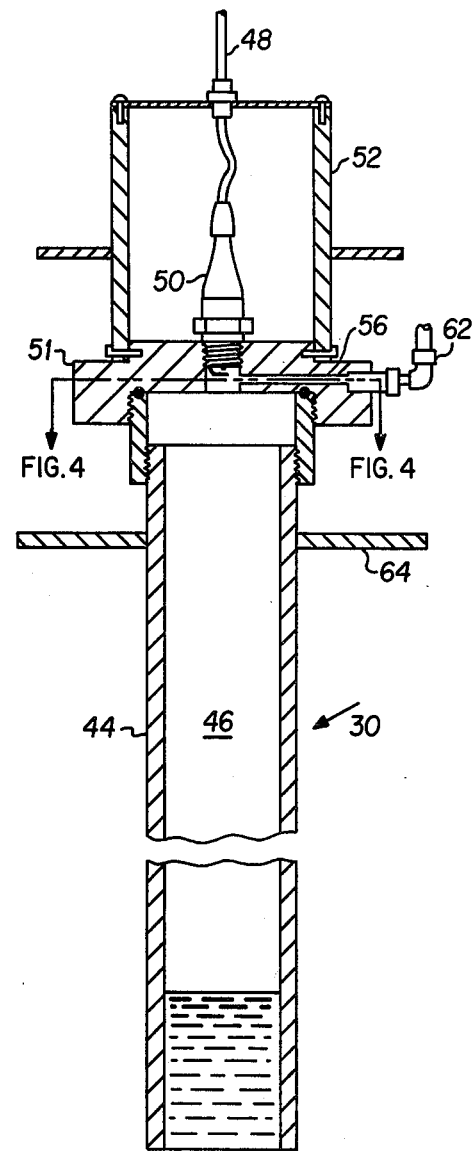
FIG. 3 is a vertical section view of the portable acoustic energy source in accordance with this invention.
Figure 4:
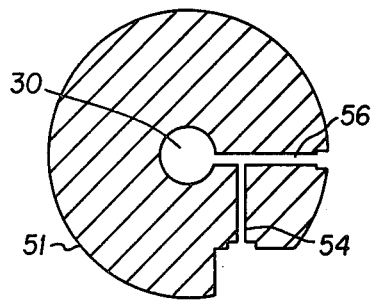
FIG. 4 is a view taken along line 4—4 in FIG. 3.

FIGS. 3 and 4 illustrate in further detail the construction of the housing 30 which may consist of the upstanding reactor tube 44 within which a combustible gas mixture 46 is formed with sufficient pressure to withstand external water pressure. A high voltage lead 48 connects the pulser 42 with a spark plug 50 threaded into a wall of the top watertight enclosure 52 so that its electrodes are in communication with the combustible gas mixture 46. The wall 51 may be drilled to provide channels 54 and 56 extending between its exterior surface and the vicinity of the electrodes of plug 50. The gas bottles 36 and 38 may be interconnected with channels 54 and 56 through suitable check valves, such as valve 60. It is desirable to premix the constituent gases from bottles 36 and 38, as shown, prior to entry within the chamber of cylinder 44.

In order to dampen the upward thrust of the housing 30, it is convenient to supply a transverse plate 64 as shown in FIG. 3 which will minimize this effect. For greater security, the entire device can be attached to a sea anchor. Finally, for purposes of retrieval, a marker device (not shown) such as a colored balloon may be fixed to the top of the float 32.

The greatest advantage is achieved with the exercise of the method described if the source 16 is constructed so that its entire weight is under fifty pounds including the enclosure 30, the float 32 and associated equipment. This will insure that it is highly maneuverable and if necessary may be transported easily on an aircraft from one location to another. The manner of placement of the source 16 is of course optional. For example, one technique is to have a helicopter carry the source 16 to an appropriate spot and drop it in position, returning to retrieve it by means of any suitable marker when test is complete. Obviously, the tow vessel 12 can also carry the source 16 aboard and arrange for its positioning and retrieval, using an auxiliary boat to eliminate the time lost in circling.

An alternative means of practicing the invention is available if the cable 10 is of the type which can be anchored in place. In that event a small motor boat may be lowered from the tow vessel and cruise with the source 16 along the length of the cable 10 to achieve the results previously described.

The embodiments of the invention in which an exclusive property or privilege is claimed are defined as follows:

1. A method of testing a marine seismic cable of the type having a plurality of electro-acoustic transducer groups disposed therealong, each of said groups having a common output comprising the steps of:
   (a) positioning an acoustic energy source at a substantially fixed location in a body of water;
   (b) energizing said source so as to inject repetitive acoustic pulses into the water;
   (c) towing said marine seismic cable past said energy source in a normally deployed condition along a course such that the amplitude of the resultant output signal of each of said plurality of transducer groups resulting from directly travelling, non-reflected waves varies substantially with distance from said source;
   (d) recording said varying output signals from said directly travelling waves for each of said transducer groups; and
   (e) visually comparing by means of said recordings the polarity and the amplitude progression of each of said output signals in order to detect the existence of anomalies in said output signals.

2. A method of testing a marine seismic cable of the type having a plurality of electro-acoustic transducer groups dispersed therealong, each of said groups having a common output, comprising the steps of:
- (a) deploying said cable at a stationary location in the water;
- (b) transporting an acoustic energy source through the water past said cable;
- (c) energizing said source so as to inject repetitive acoustic pulses into the water, the course followed by said source being such that the amplitude of the resultant output signals of each of said transducer groups resulting from directly travelling, non-reflected waves varies substantially with distance from said source;
- (d) separately recording the varying signal output of each of said groups of transducers from said directly travelling waves; and
- (e) visually comparing by means of said recordings the polarity and amplitude progression of each of said output signals in order to detect deviations from the normal wave shape of each of said output signals and the decay characteristics thereof with variation in said distance.

* * * * *